Inventor
George Hunt

Sept. 25, 1945. G. HUNT 2,385,517
CLUTCH
Filed Jan. 19, 1944 2 Sheets-Sheet 2

Inventor
George Hunt
By Blackmor, Spencer & Hunt
Attorneys

Patented Sept. 25, 1945

2,385,517

UNITED STATES PATENT OFFICE 2,385,517

CLUTCH

George Hunt, Dayton, Ohio, assignor to General Motors Corporation, Detroit, Mich., a corporation of Delaware Application January 19, 1944, Serial No. 518,811

6 Claims. (Cl. 192—69)

This invention has been made to improve the operation of a clutch of the double driven disc type and, while useful in other relations, has been designed particularly for heavy vehicles.

The object of the invention is to provide a frictional surface area which shall be greater than in the case of the conventional single disc type. Another object is to insure release of all the frictional engaging faces when the clutch is released. Another and important object is to provide a simple expedient operating automatically to effect adjustment for wear. Other objects will appear as one reads the following description.

Figure 1:
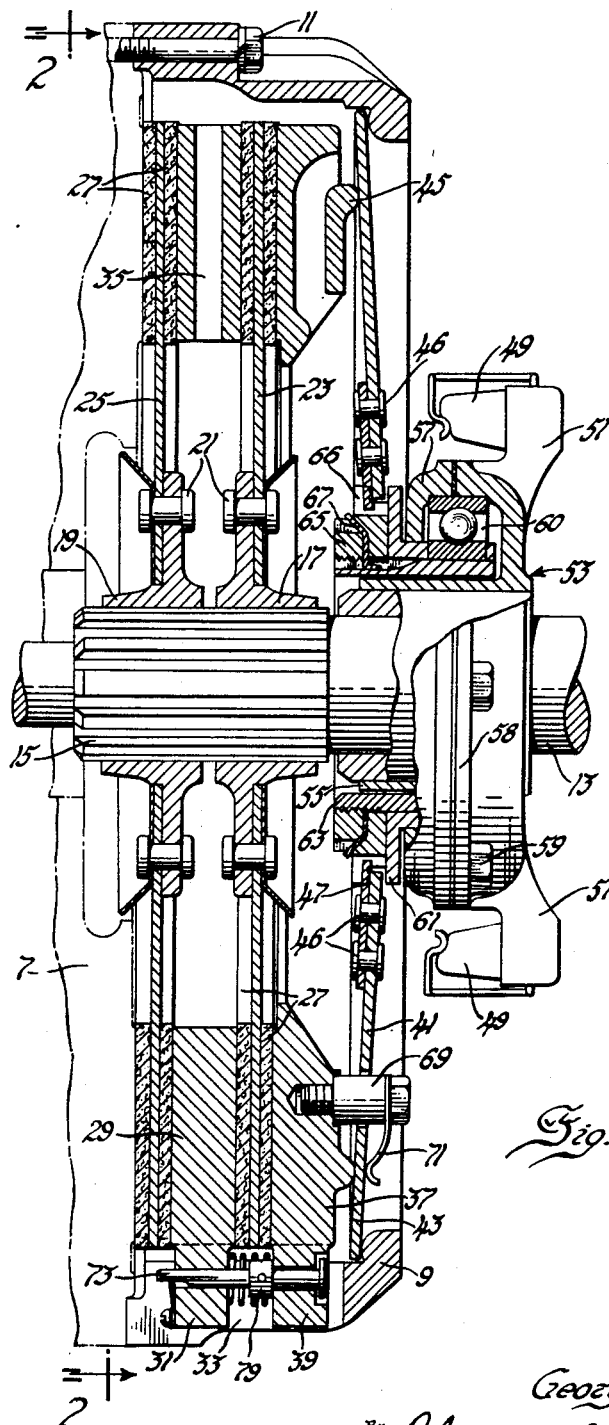
Figure 1 is a transverse section through the clutch.
Figure 2:
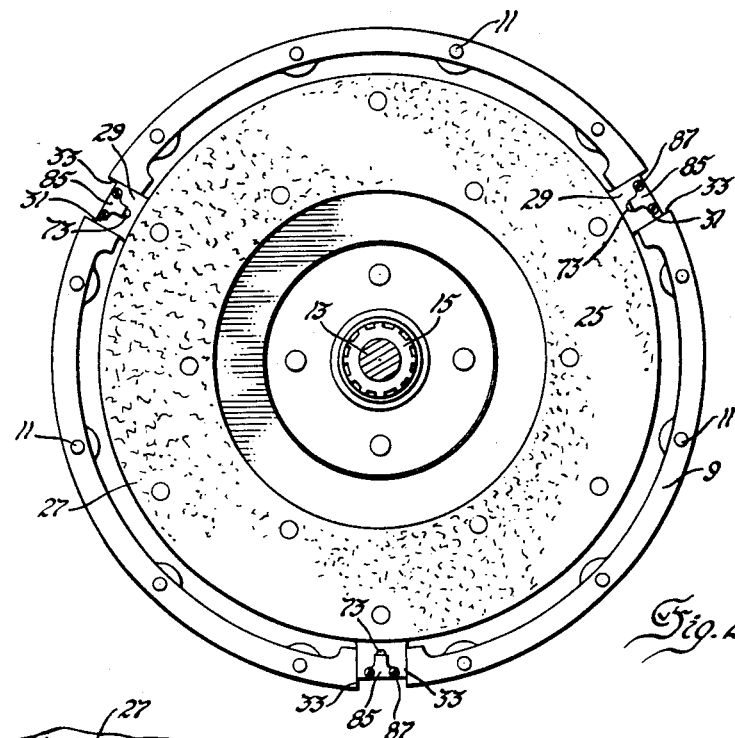
Figure 2 is a view as seen from line 2—2 of Figure 1.
Figure 3:
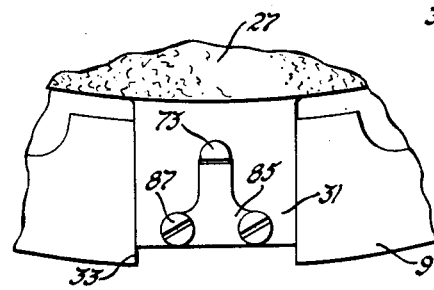
Figure 3 is an enlarged detail.

Referring to the drawings, the clutch is shown associated with a conventional flywheel marked 7. A cover member 9 is secured to the flywheel by bolts 11 as usual and forms a clutch housing to enclose the usual pressure plates and driven discs.

The conventional transmission shaft is marked 13. It has a splined portion 15 to receive slidably two spaced driven disc hubs 17 and 19. To the hubs are secured by fastening means 21 driven discs 23, 25 which carry on their opposite surfaces friction facings 27. Between the driven discs 23 and 25 is a pressure plate 29. This pressure plate has radial lugs 31 which enter cover slots 33 so that the rotation of the flywheel and cover is transmitted to the pressure plate. The pressure plate 29 may have radial passages 35 for cooling as is customary. The pressure plate may slide toward and from the flywheel, the lugs 31 traveling on the slots 33. It will be evident that when the pressure plate 29 approaches the flywheel the facings 27 of driven plate 25 frictionally engage the flywheel face and the face of the pressure plate. A second pressure plate 37 is also used. It, too, has guiding and driving lugs 39. This plate is on that side of driven plate 23 remote from the flywheel and when moved toward the flywheel the facings of driven plate 23 are gripped by the adjacent surfaces of the two pressure plates.

The cover 9 serves as the abutment for the clutch engaging spring for which I have chosen a coned or Belleville washer type of spring marked 41. This spring when unrestrained by the clutch releasing means fulcrums on a ring surface 43 on the cover and exerts pressure on a similar ring surface 45 on pressure plate 37. Adjacent the central opening of the coned spring there may be attached at 46 two or more fingers 47 to be engaged by the axially slidable releasing means. The releasing means may be moved to clutch releasing position, to the right in the drawing, by the forked ends 49 of a suitable lever, not shown. These ends engage radially projecting parts 51 of a cup-shaped member 53 formed integrally with a sleeve 55. A cover for the releasing means is marked 57 and the two parts 58 and 57 are secured together by bolts 59. Within the enclosure formed parts 53 and 57 is a bearing 60 which is retained by a retainer 61. Upon the sleeve 55 and projecting into the enclosure is a bearing guide 63 to which the retainer is keyed. The guide is threaded to receive a nut 65 between which and the retainer 61 is a hub 66 for engaging the fingers 57, there being shown a lock washer 67 between the nut and the hub. When the lever ends move the throwout assembly to the right the hub 66 moves the inner region of the spring 41 to the right. Its pressure on pressure plate 37 is relieved.

To the pressure plate 37 are secured bolts 69 projecting out through openings in the spring plate as shown. Under the heads of these bolts are yielding spring members 71 engaging the spring plate. As the spring plate is pulled off the pressure plate the movement of the spring plate effects, through parts 71 and 69, a movement of the pressure plate 37 to the right to relieve the pressure upon the facings of driven plate 23.

One of the problems encountered in such double disc clutches is the release of the frictional contact of the facings of both driven discs. That problem has been solved as follows. A plurality of bolts 73 are distributed about the clutch and extend through passages in both pressure plates as shown. In plate 37 there is recess 75 within which the head 77 of the bolt 73 is received. Each bolt has secured thereto between the pressure plates, a sleeve 79 and a coil spring 81 surrounds the bolt and contacts the adjacent surfaces of the pressure plates to hold them apart when the clutch is released. The end of the bolt is undercut as at 83 and is engaged by a spring device 85 attached to pressure plate 29 at 87. The dimension of the spring device is such that the bolt may be advanced toward the left so that the spring device engages and grips the bolt at new positions toward the right but the spring device holds the bolt from moving toward the right through plate 29. When the clutch is engaged there is a little space between the head of the bolt 73 and the bottom wall of recess 75 as shown by Figure 5.

Figure 5:
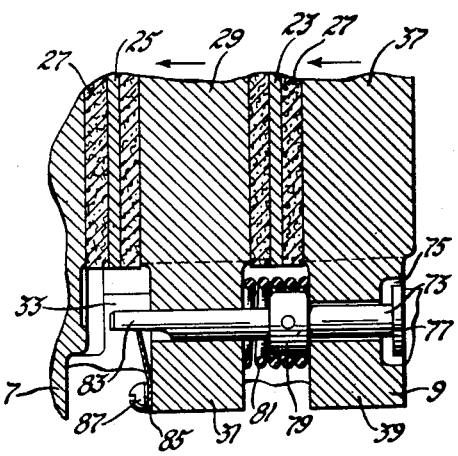
Figure 5 is a similar section showing the position of the parts when the clutch is engaged.
Figure 4:
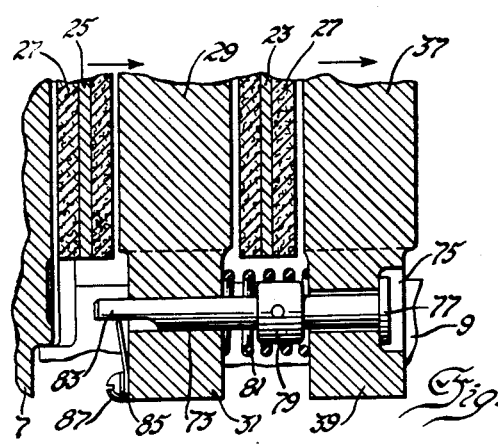
Figure 4 is a sectional view corresponding to a part of Figure 1 and showing on a larger scale the position of the parts when the clutch is released.

The operation of the mechanism associated with bolt 73 is as follows:

If the clutch is engaged under the influence of its spring 41 the parts are as shown in Figure 5. The spring has pushed pressure plate 37 to the left and it has pushed the pressure plate 29 through the instrumentality of the facings on driven disc 23 so that the facings of driven disc 25 are gripped between the flywheel and pressure plate 29. All facings are effective to produce frictional resistance to slip. If now the clutch is released by withdrawing the throwout sleeve, plate 37 is moved to the right by the movement of the spring 41 acting upon the bolt 69 as explained above. After a limited movement of plate 37 it picks up the head of bolt 77 by engagement between the bottom of recess 75 and said bolt head. Further movement of plate 37 pulls the pressure plate 29 positively away from the driven plate 25 because of the grip of 85 on the bolt. The spring 81 maintains the desired spaced relation of the two pressure plates. The released position is shown by Figure 4. In applying the clutch the pressure plate 37, as explained above, not only moves pressure plate 29 through the facings of driven plate 23 but it develops a clearance at the bolt head and removes the clearance adjacent the sleeve 79. If, by chance, the facings are reduced in thickness by wear a movement somewhat more than normal is required. Under these circumstances in the act of clutch engagement plate 37 pushes the bolt by contact with the sleeve 79 and the spring 85 grips the bolt in its new position of adjustment. By the expedient described the normal clearance is always present avoiding the need of excessive clutch pedal travel. The release is always positive avoiding any dragging of the friction members. The construction is very simple and easily installed.

I claim:

1. In a clutch, a driving member, spaced first and second pressure plates rotatable therewith, spaced driven discs one adjacent the driving member and the other between the pressure plates, means to reciprocate said pressure plates, other means to automatically take up wear and including a part extending through said pressure plates, said part having enlargements on opposite sides of said first pressure plate and spaced to an extent greater than the thickness of said pressure plate and a one-way clutch device between said other means and said second pressure plate.

2. In a clutch having a plurality of driven discs and a plurality of pressure plates, means actuated by a releasing movement of one pressure plate to positively release a second pressure plate, said means including a mechanism to compensate for wear, said means including a bolt extending through axially aligned openings in said pressure plates, a head on said bolt and a sleeve secured to said bolt and located between said pressure plates in predetermined spaced relation to said head.

3. In a clutch having a plurality of driven discs and a plurality of pressure plates, means actuated by a releasing movement of one pressure plate to positively release a second pressure plate, said means including a mechanism to compensate for wear, said means including a bolt extending through axially aligned openings in said pressure plates, a head on said bolt and a sleeve secured to said bolt and located between said pressure plates in predetermined spaced relation to said head and said mechanism comprising a spring device secured to one of said pressure plates and engaging said bolt whereby the bolt may move in one direction only relative to said last named pressure plate.

4. In a clutch, a flywheel, first and second axially spaced pressure plates, a first driven disc between the flywheel and first pressure plate, a second driven disc between the first and second pressure plates, spring means to engage the clutch, means to overcome said spring means and release the clutch, a bolt extending through registering openings in said pressure plates, a head on said bolt on the side of the second pressure plate remote from the first pressure plate, abutment means on said bolt between said pressure plates positioned to provide a predetermined relative axial movement between said bolt and second pressure plate.

5. The invention defined by claim 4, together with means associated with said bolt and said first pressure plate whereby a relative movement in one direction only therebetween is provided.

6. The invention defined by claim 4, said bolt having an undercut region on the part thereof on the flywheel side of the first pressure plate, a plate spring secured to the first pressure plate, said spring dimensioned to be bent in assembly in a way to permit the bolt to move toward the flywheel but to hold it from movement through the first pressure plate in the opposite direction whereby the clutch may be positively released and whereby automatic compensation for wear may take place.

GEORGE HUNT.